United States Patent
Rhee et al.

(10) Patent No.: US 7,286,849 B2
(45) Date of Patent: Oct. 23, 2007

(54) SYSTEM AND METHOD OF CONTROLLING AUDIO OUTPUT IN MOBILE COMMUNICATION TERMINAL HAVING TELEVISION FUNCTION

(75) Inventors: Myoung Kyu Rhee, Gyounggi-Do (KR); Jung Won Lee, Seoul (KR)

(73) Assignee: Pantech & Curitel Communications, Inc. (KR)

( * ) Notice: Subject to any disclaimer, the term of this patent is extended or adjusted under 35 U.S.C. 154(b) by 6 days.

(21) Appl. No.: 11/177,367

(22) Filed: Jul. 11, 2005

(65) Prior Publication Data

US 2006/0089179 A1    Apr. 27, 2006

(30) Foreign Application Priority Data

Oct. 22, 2004   (KR) ...................... 10-2004-0084965

(51) Int. Cl.
    *H04M 1/00*   (2006.01)
(52) U.S. Cl. ................ 455/556.1; 455/574; 455/550.1; 348/552; 348/14.02
(58) Field of Classification Search ............. 455/556.1, 455/574, 550.1; 348/552, 14.02
    See application file for complete search history.

(56) References Cited

U.S. PATENT DOCUMENTS

| | | | | |
|---|---|---|---|---|
| 4,349,701 A | * | 9/1982 | Snopko | 348/552 |
| 5,890,071 A | * | 3/1999 | Shimanuki | 455/567 |
| 6,552,753 B1 | * | 4/2003 | Zhurbinskiy et al. | 348/738 |
| 6,629,742 B2 | * | 10/2003 | Fujii | 347/12 |
| 2004/0051813 A1 | * | 3/2004 | Marmaropoulos | 348/553 |

* cited by examiner

*Primary Examiner*—Danh Le
(74) *Attorney, Agent, or Firm*—Dickstein Shapiro LLP

(57) ABSTRACT

Disclosed are a system and a method of controlling an audio output in a mobile communication terminal, and more particularly to a system and a method of controlling an audio output of mobile communication terminal, wherein when a broadcasting channel is changed, an audio signal of the mobile communication terminal is not outputted for a preset time or in an ineffective channel from which a broadcasting does not come through.

The mobile communication terminal having a television function according to an embodiment of the invention is characterized in that when a broadcasting channel is changed, a video signal is outputted and at the same time an audio signal is not outputted by turning off the amplifier for a preset time, and when the preset time lapses, the amplifier is turned on and thus the audio signal is outputted.

12 Claims, 2 Drawing Sheets

SYSTEM AND METHOD OF CONTROLLING AUDIO OUTPUT IN MOBILE COMMUNICATION TERMINAL HAVING TELEVISION FUNCTION

CROSS-REFERENCE TO RELATED APPLICATION

The present application is claiming priority of Korean Patent Application No. 10-2004-0084965, filed on Oct. 22, 2004, the content of which is herein incorporated by reference.

BACKGROUND OF THE INVENTION

1. Field of the Invention

The present invention relates to a system and a method of controlling an audio output of a mobile communication terminal, and more particularly to a system and a method of controlling an audio output of a mobile communication terminal, wherein when a broadcasting channel is changed, an audio signal of the mobile communication terminal is not outputted for a preset time or in an ineffective channel from which a broadcasting does not come through.

2. Description of the Related Art

Recently, additional functions of a mobile communication terminal are continuously developed as a mobile communication technology is developed. As a result, it is allowed to provide a television function to the mobile communication terminal by adopting multi-media functions in the mobile communication terminal.

In a multi-media mobile communication terminal having a television function, as a method of seeking an effective channel from which a broadcasting comes through, it can be used to a hand-operated method which is applied through keypad operation of the mobile communication terminal by a user or a method which adapts an automatic channel seeking function provided by a demodulator loaded in the mobile communication terminal.

In the automatic channel seeking function, a register value provided by the demodulator is read, and thus it is discriminated whether a currently set channel is an effective channel from which a broadcasting actually comes through, based on whether a carrier exists in a signal currently received through an antenna of the mobile communication terminal.

However, the mobile communication terminal having a television function as described above is structured to output image and audio when its broadcasting channel is changed, regardless of whether the changed channel is an effective channel from which a broadcasting actually comes through or an ineffective channel from which the broadcasting does not come through.

Accordingly, if the changed channel is the ineffective channel, a noise is outputted as it is even though the broadcasting does not actually come through, so that a power is more consumed than it needed to be and a user feels a repellent sense due to the noise.

SUMMARY OF THE INVENTION

Accordingly, the present invention has been made to solve the above-mentioned problems occurring in the prior art. The object of the present invention is to provide a system and a method of controlling an audio output of a mobile communication terminal having a television function, wherein when a broadcasting channel is changed, an audio signal of the mobile communication terminal is not outputted for a preset time, so that a user does not need to hear an undesired noise outputted from the changing channel.

The other object of the invention is to provide a system and a method of controlling an audio output of a mobile communication terminal having a television function, wherein when a currently set broadcasting channel is an ineffective channel from which a broadcasting does not come through, a power of an amplifier amplifying an audio signal is turned-off so as not to output the audio signal, so that power consumption is reduced and an unnecessary noise is not outputted at the same time.

In order to accomplish the objects, the present invention provides a system of controlling an audio output of a mobile communication terminal having a television function comprising an amplifier amplifying an audio signal; a controller sensing a change of a broadcasting channel and thus outputting an electrical signal for turning off the amplifier; and a timer device starting to be operated as soon as the amplifier is turned off according to the electrical signal of the controller and maintaining the off-state of amplifier for a preset time.

Preferably, the system may further comprise a power switch turning off the amplifier by receiving the electrical signal outputted from the controller and thus cutting off a power to be supplied to the amplifier.

Meanwhile, in order to achieve the objects, the present invention provides a system of controlling an audio output of a mobile communication terminal having a television function comprising a demodulator storing a status register for discriminating whether a carrier exists in a signal received from an antenna of the mobile communication terminal or not, and outputting a video signal and an audio signal which are separated from the broadcasting signal; an amplifier amplifying the audio signal outputted from the demodulator; a decoder storing a status register for discriminating whether a video synchronizing signal exists in the video signal outputted from the demodulator or not; and a controller discriminating whether a channel of the signal received from the antenna is an effective channel or not, and outputting an electrical signal for turning on/off the amplifier according to the discriminating result.

Preferably, the system may further comprise a power switch turning on/off the amplifier by receiving the electrical signal outputted from the controller and thus supplying a power to the amplifier or cutting off the power.

In addition, it is preferred that if the set channel is an effective channel, the amplifier is turned on and thus amplifies the audio signal, and if the set channel is an ineffective channel, the amplifier is turned off and thus does not amplify the audio signal.

Additionally, the controller preferably sets or reads each of the status registers of the demodulator and the decoder. More preferably, the controller performs the setting or read of each of the status registers of the demodulator and the decoder using an I2C (Inter Integrated Circuit) communication technique under control of the controller.

In order to accomplish the above objects, the present invention provides a method of controlling an audio output of a mobile communication terminal having a television function comprising steps of: sensing a change of a broadcasting channel by a controller loaded in the mobile communication terminal; turning off an amplifier amplifying an audio signal of the broadcasting channel by a controller in the mobile communication terminal; maintaining the off state of the amplifier by activating a timer device for a preset time, as soon as the amplifier is turned off; and removing the off state of the amplifier when the preset time lapses.

Preferably, images corresponding to video signals of the changed broadcasting channel are outputted through a display screen on the mobile communication terminal during the power off state of the amplifier.

In order to achieve the above objects, the present invention provides a method of controlling an audio output in a mobile communication terminal having a television function comprising steps of: sensing a change of a broadcasting channel by a controller loaded in the mobile communication terminal; discriminating whether the changed channel is an effective or ineffective channel by the controller in the mobile communication terminal; and turning on/off an amplifier amplifying an audio signal of the changed channel by a controller in the mobile communication terminal according to the discriminating result.

Preferably, the step of discriminating whether the changed channel is an effective or ineffective channel may comprise steps of: reading a status register of a demodulator loaded in the mobile communication terminal and thus judging whether a carrier is contained in a broadcasting signal corresponding to the changed channel, by the controller; and recognizing the changed channel as the ineffective channel by the controller if the carrier does not exist.

Alternatively, the step of discriminating whether the changed channel is an effective or ineffective channel may comprise steps of: reading a status register of a decoder loaded in the mobile communication terminal and thus judging whether a video-synchronizing signal is contained in a video signal separated from a broadcasting signal corresponding to the changed channel, by the controller; and recognizing the changed channel as the ineffective channel by the controller if the video-synchronizing signal does not exist.

More preferably, the step of discriminating whether the changed channel is an effective or ineffective channel may comprise steps of: reading a status register of a demodulator loaded in the mobile communication terminal and thus judging whether a carrier is contained in a broadcasting signal corresponding to the changed channel, by the controller; reading a status register of a decoder loaded in the mobile communication terminal and thus judging whether a video-synchronizing signal is contained in a video signal separated from a broadcasting signal corresponding to the changed channel, by the controller; and recognizing the changed channel as the ineffective channel by the controller if at least one of the carrier and the video-synchronizing signal does not exist.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
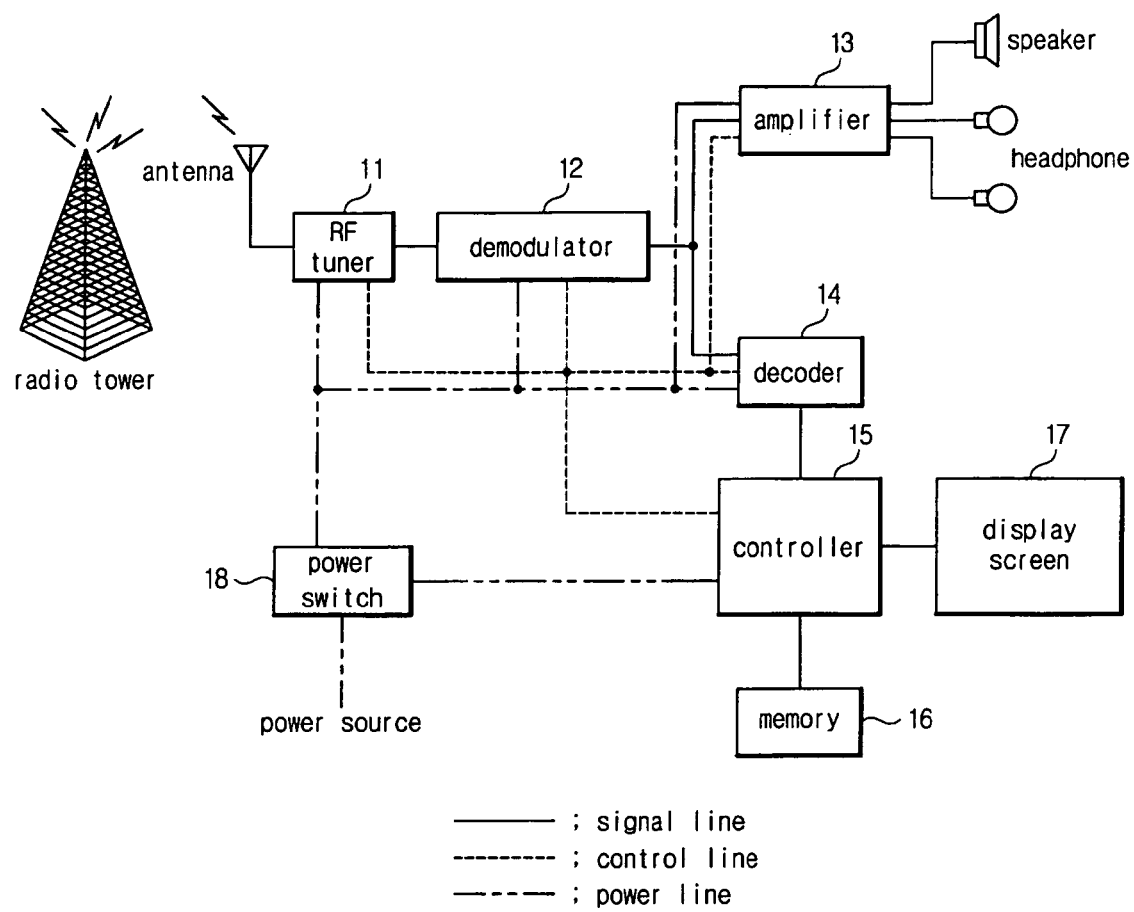
FIG. 1 is a block diagram showing a structure of a mobile communication terminal comprising an audio output control system according to an embodiment of the invention.

FIG. 1 is a block diagram showing a structure of a mobile communication terminal comprising an audio output control system according to an embodiment of the invention. As shown in FIG. 1, the mobile communication terminal having a television function according to an embodiment of the invention comprises a RF tuner 11, a demodulator 12, an amplifier 13, a decoder 14, a controller 15, a memory 16, a display screen 17 and a power switch 18.

The RF tuner 11 converts a broadcasting signal received from a radio tower of a broadcasting station into a signal of an intermediate frequency. The broadcasting signal converted by the RF tuner 11 is applied to the demodulator 12 under control of the controller 15.

The demodulator 12 separates the broadcasting signal applied from the RF tuner 11 into an audio signal and a video signal. Under control of the controller 15, the audio signal is applied to the amplifier 13 and the video signal is applied to the decoder 14. The demodulator 12 comprises a status register (i.e., register discriminating whether or not a carrier) capable of discriminating whether a carrier exists in the broadcasting signal (i.e., signal of an intermediate frequency) applied from the RF tuner 11 or not. The register is provided to discriminate whether a currently set channel is an effective channel from which a broadcasting actually comes through.

The amplifier 13 amplifies the audio signal applied from the demodulator 12 under control of the controller 15. The amplified audio signal is outputted from an audio output means such as a speaker or headphone.

The decoder 14 converts the analog video signal applied from the demodulator 12 into a digital video signal using a video-synchronizing signal (vertical synchronizing signal and horizontal synchronizing signal) contained in the analog video signal. The decoder 14 comprises a status register (i.e., register discriminating whether or not a video-synchronizing signal) capable of discriminating whether a vertical synchronizing signal and a horizontal synchronizing signal exist in the broadcasting signal (i.e., video signal) applied from the demodulator 12 or not, in order to discriminate whether a currently set channel is an effective channel from which a broadcasting actually comes through.

The controller 15 controls operations of all elements constituting the audio output control system. Specifically, when a mode of the mobile communication terminal is set to a television mode, the controller 15 closes the power switch 19 through General Purpose I/O (GPIO) control port and thus supplies a power of a battery to the audio output control system. To the contrary, when the television mode is cleared, the controller 15 opens the power switch 19 through the corresponding I/O control port and thus controls the power of the battery not to be supplied to the audio output control system.

In addition, for a normal operation of the elements constituting the audio output control system, the controller 15 sets up a register of each constituting element.

Meanwhile, the controller 15 discriminates whether a changed channel is an effective channel from which a broadcasting actually comes through, using both a status register of the demodulator 12 and a status register of the decoder 14.

If the changed channel is an effective channel, the controller 15 controls a power to be supplied to the amplifier 13 so as to output an audio signal. To the contrary, if the changed channel is an ineffective channel having no broadcasting signals, the controller 15 cuts off the power to be supplied to the amplifier 13 and thus controls an audio signal not to be outputted.

According to another embodiment, the controller 15 controls the amplifier 13 so that an audio signal is not outputted for a preset time (for example, a few seconds) when a channel is changed, regardless of whether the changed channel is an effective channel or not. And the controller 15 also runs a timer device (not shown) so that the audio signal is not outputted during the operation of the timer.

The controller 15 serves to control operations of the elements constituting the audio output control system. An I2C controller can be employed as the controller.

A register of each of the constituting elements is set so that the elements constituting the audio output control system are normally operated according to the command of the controller 15. In this case, an I2C communication technique (The I2C Specification, Version 2.1, January 2000, Phillips Semiconductor) can be used to set and read a register value.

An exemplary of a register setting is as follows. For changing a broadcasting channel in a television mode of a mobile communication terminal, an operating frequency of a signal received from an antenna should be changed. This means that a PLL (Phase Locked Loop) register of the RF tuner 11 should be changed. In addition, for changing volumes of an audio in the television mode of the mobile communication terminal, a sound level of the amplifier 13 should be changed.

The memory 16 stores a program and data required for the controller 15 and serves to read or store various information for controlling an audio output.

The display screen 17 receives a digital image data outputted from the decoder 14 and displays an image under control of the controller 15.

The power switch 18 serves to supply or cut off a battery power to the audio output control system. That is, when a mode of the mobile communication terminal is set up to a television-on mode, the power switch 18 is closed so that the battery power is supplied to the audio output control system. To the contrary, when a mode of the mobile communication terminal is set to a television-off mode, the power switch is opened so that the battery power to be supplied to the audio output control system is cut off.

Hereinafter, an operation of the audio output control system in the mobile communication terminal having a television function will be described.

Firstly, when a user inputs a television-on mode using a keypad provided to a mobile communication terminal, the controller 15 senses the inputted signal and thus closes the power switch 18 so as to supply a power to an audio output control system.

Subsequently, a broadcasting signal transmitted from a broadcasting station is received via the antenna and then converted into a signal of an intermediate frequency (for example, 45.75 MHz) in the RF tuner 11. The converted broadcasting signal is applied to the demodulator 12. The demodulator 12 separates the applied broadcasting signal into an audio signal and a video signal. The audio signal is applied to the amplifier 13 and the video signal is applied to the decoder 14.

At this time, the controller 15 sets up a value capable of discriminating whether a carrier exists in the signal of the intermediate frequency applied from the RF tuner 11 or not, into a status register (i.e., register discriminating whether or not a carrier). This is done to discriminate whether a currently set channel is an effective channel from which a broadcasting actually comes through, when performing a channel seeking function later.

Meanwhile, if the video signal outputted from the demodulator 12 is a video signal of the effective channel, it also contains a video-synchronizing signal (vertical synchronizing signal and horizontal synchronizing signal). That is, regarding a video signal of an effective channel, when a broadcasting station transmits a video signal, it also transmits a video-synchronizing signal (vertical and horizontal synchronizing signals) together with the video signal.

The amplifier 13 amplifies the audio signal received from the demodulator 12 and the amplified audio signal is outputted via an output means such as a speaker or headphone.

The decoder 14 which received the video signal from the demodulator 12 converts the analog video signal into a digital signal using the vertical and horizontal synchronizing signals contained in the video signal. An image corresponding to the digital signal is displayed on the display screen 17.

Meanwhile, the controller 15 sets up a value capable of discriminating whether a vertical synchronizing signal and a horizontal synchronizing signal exist in the video signal applied from the demodulator 12 or not, into a status register (i.e., a register discriminating whether or not a video-synchronizing signal) of the decoder 14. By doing like this, it is possible to complement the effective channel discriminating function provided by the demodulator 12 and thus to more correctly discriminate whether the currently set channel is an effective channel from which a broadcasting actually comes through.

Figure 2:
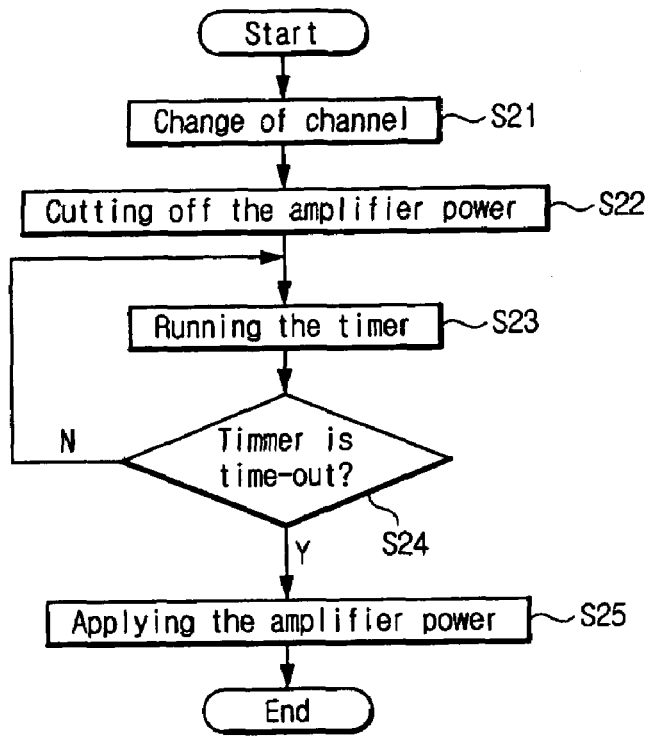
FIG. 2 is a flow chart showing a method of controlling an audio output in a mobile communication terminal, according to an embodiment of the invention.

Hereinafter, a method of controlling an audio output of a mobile communication terminal having a television function according to an embodiment of the invention will be described with reference to FIG. 2.

Firstly, when a user manipulates a corresponding key of a mobile communication terminal so as to change a channel, the controller 15 changes a PLL register of the RF tuner 11 according to the manipulation and regulates a receiving frequency of the mobile communication terminal, and thus controls the broadcasting channel to be changed (step S21).

The RF tuner 11 receives a broadcasting signal corresponding to the changed channel from the antenna and converts the received signal into a signal of an intermediate frequency (for example, 45.75 MHz). The converted signal is applied to the demodulator 12.

The demodulator 12 separates the signal of the intermediate frequency into an audio signal and a video signal. The audio signal of the separated signals is applied to the amplifier 13 and the video signal is applied to the decoder 14.

The decoder 14 converts the video signal received from the demodulator 12 into a digital data form and then displays the converted signal through the display screen 17.

Meanwhile, when changing the channel, the controller 15 controls the audio signal to be outputted later than the video signal so that the user does not need to hear a noise of an ineffective channel from which a broadcasting does not come through.

In other words, the controller 15 cuts off the power to be supplied to the amplifier 13 as soon as the channel is changed and runs a timer device in order to maintain the cut off state for a preset time (step S22). During the operation of the timer device, a supply of power to the amplifier is cut off (step S23).

When the preset time (for example, a few seconds) lapses and thus the operation of the timer device is completed, the controller 15 checks the time-out of the timer device (step S24) and then closes the power switch to supply the power to the amplifier 13 for normal audio output. As a result, the audio signal applied from the demodulator 12 is outputted via an output means such as a speaker or headphone (step S25).

While the audio signal is not outputted due to the operation of the timer device, the user can discriminate whether the changed channel is an effective channel from which a broadcasting actually comes through, by checking an image displayed on the display screen 17. Accordingly, even though the changed channel is an ineffective channel, the user does not need to hear noises of the ineffective channel since she or he can change the channel before the audio is outputted.

Figure 3:
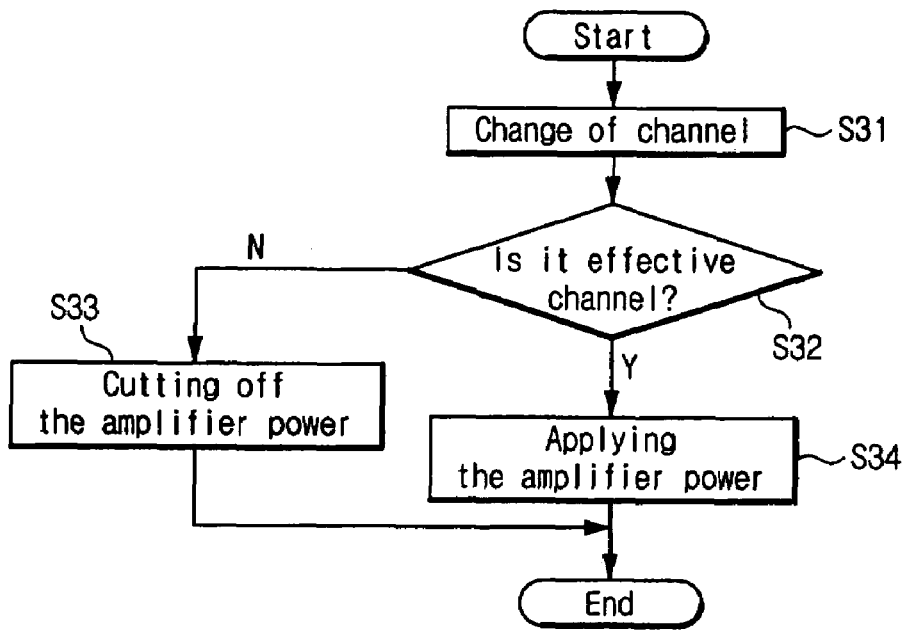
FIG. 3 is a flow chart showing a method of controlling an audio output in a mobile communication terminal, according to another embodiment of the invention.

Hereinafter, a method of controlling an audio output in a mobile communication terminal having a television function according to another embodiment of the invention will be described with reference to FIG. 3.

Firstly, when a user manipulates a corresponding key of a mobile communication terminal so as to change a channel, the controller 15 changes a PLL register of the RF tuner 11 according to the manipulation and regulates a receiving frequency of the mobile communication terminal, and thus controls the broadcasting channel to be changed (step S31).

The RF tuner 11 receives a broadcasting signal corresponding to the changed channel from the antenna and converts the received signal into a signal of an intermediate frequency (for example, 45.75 MHz). The converted signal is applied to the demodulator 12.

The demodulator 12 separates the signal of the intermediate frequency into an audio signal and a video signal. The audio signal of the separated signals is applied to the amplifier 13 and the video signal is applied to the decoder 14.

At this time, the controller 15 discriminates whether the changed channel is an effective channel or not (step S32).

As a method of discriminating whether the changed channel is an effective channel or not, it can be used to a method which uses only a status register of the demodulator 12, a method which uses only a status register of the decoder 14 or a method which uses both a status register of the demodulator 12 and a status register of the decoder 14. As described above, the method that uses both the status registers has an advantage of reducing an error in channel seeking, compared to methods of only one status register.

Only the method of using both a status register of the demodulator 12 and a status register of the decoder 14 will be described herein. Firstly, in order to discriminate an effectiveness of the current channel, the controller 15 reads the value set in the status register of the demodulator 12. In other words, the controller reads the status register of the demodulator 12 for the currently set channel and thus discriminates whether a carrier exists in a signal of an intermediate frequency applied from the RF tuner 11 or not.

If carrier does not exist in the signal of the intermediate frequency, the controller 15 recognizes that the currently set channel is an ineffective channel. Then, in the case of performing an automatic channel seeking function, the controller shifts the channel to the next (i.e., an up or down channel of the currently set channel) automatically. Subsequently, the controller repeats the processes for discriminating whether a carrier exists in a signal of an intermediate frequency applied from the RF tuner 11 or not.

When the channel shifts to the next by the controller, the controller 15 cuts off the power to be supplied to the amplifier 13 or changes a level value of the amplifier 13 to 'zero' in order not to outputting audio signal of the shifted channel (step S33).

The decoder 14 converts the video signal received from the demodulator 12 into a digital signal. An image corresponding to the digital signal is displayed on the display screen 17.

To the contrary, if a carrier exists in the signal of the intermediate frequency, the controller 15 reads a value set in the status register of the decoder 14 for the currently set channel and thus discriminates whether a video-synchronizing signal (i.e., vertical and horizontal synchronizing signals) exists in the video signal applied to the decoder 14 or not.

As a result of the discrimination, if the video-synchronizing signal does not exist in the video signal applied to the decoder 14, the controller 15 recognizes that the currently set channel is an ineffective channel from which a broadcasting does not actually come through. In this case, the controller 15 opens the power switch to cuts off supplying power for the amplifier 13 or changes a level value of the amplifier 13 to 'zero' in order not to outputting audio signal of the ineffective channel.

To the contrary, if the video-synchronizing signal exists in the video signal applied to the decoder 14, the controller 15 recognizes that the currently set channel is an effective channel from which a broadcasting actually comes through. In this case, the controller 15 closes the power switch to supply a power to the amplifier 13 or changes a sound level of the amplifier 13 to a normal. By doing like this, the audio signal applied from the demodulator 12 is outputted from an audio output means such as a speaker or headphone (step S34).

Accordingly, if the changed channel is an effective channel from which a broadcasting actually comes through, an audio signal is also outputted together with an video signal. To the contrary, if the changed channel is an ineffective channel, an audio signal of the ineffective channel is not outputted while a video signal of the ineffective channel is outputted. Accordingly user can recognize the ineffective channel under state that she or he does not need to hear noises of the ineffective channel.

As described above, according to the invention, it is checked whether or not a actual broadcasting signal on the currently set channel. As a result of the check, when the currently set channel is judged to be an ineffective channel from which a broadcasting does not come through, a power is not temporarily supplied to an amplifier for an audio output. Accordingly, unnecessary power consumption is reduced and undesired noises are not outputted, so that a user's repellent sense can be eliminated. In addition, a quality of service provided to a user is improved, so that it is possible to meet a purchasing requirement and a sense of satisfaction of the user.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system of controlling an audio output of a mobile communication terminal having a television function comprising:
   an amplifier amplifying an audio signal;
   a controller outputting an electrical signal for turning off the amplifier when a user changes a broadcasting channel of the mobile communication terminal which is in a television mode; and
   a timer device starting to be operated as soon as the amplifier is turned off according to the electrical signal of the controller and maintaining the off-state of amplifier for a preset time.

2. The system according to claim 1, further comprising a power switch turning off the amplifier by receiving the electrical signal outputted from the controller and thus cutting off a power to be supplied to the amplifier.

3. A system of controlling an audio output of a mobile communication terminal having a television function comprising:
   a demodulator storing a status register for discriminating whether a carrier exists in a signal received from an antenna of the mobile communication terminal or not, and outputting a video signal and an audio signal which are separated from the broadcasting signal;
   an amplifier amplifying the audio signal outputted from the demodulator;
   a decoder storing a status register for discriminating whether a video synchronizing signal exists in the video signal outputted from the demodulator or not;
   a controller discriminating whether a channel of the signal received from the antenna is an effective channel or not, and outputting an electrical signal for turning on/off the amplifier according to the discriminating result.

4. The system according to claim 3, further comprising a power switch turning on/off the amplifier by receiving the electrical signal outputted from the controller and thus supplying a power to the amplifier or cutting off the power.

5. The system according to claim 3, wherein if the set channel is an effective channel, the amplifier is turned on and thus amplifies the audio signal, and if the set channel is an ineffective channel, the amplifier is turned off and thus does not amplify the audio signal.

6. The system according to claim 3, wherein the controller sets or reads each of the status registers of the demodulator and the decoder, so that the controller discriminates whether the channel of the signal is an effective or ineffective channel.

7. The system according to claim 3, wherein the controller performs the setting or read of each of the status registers of the demodulator and the decoder using an I2C communication technique under control of the controller.

8. A method of controlling an audio output of a mobile communication terminal having a television function comprising:
   sensing a change of a broadcasting channel of the mobile communication terminal which is in a television mode by a controller loaded in the mobile communication terminal;
   turning off an amplifier amplifying an audio signal of the broadcasting channel by the controller;
   maintaining the off state of the amplifier by activating a timer device for a preset time, as soon as the amplifier is turned off; and
   removing the off state of the amplifier when the preset time lapses.

9. The method according to claim 8, wherein images corresponding to video signals of the changed broadcasting channel are outputted through a display screen on the mobile communication terminal during the power off state of the amplifier.

10. A method of controlling an audio output in a mobile communication terminal having a television function comprising:
    sensing a change of a broadcasting channel by a controller loaded in the mobile communication terminal;
    discriminating whether the changed channel is an effective or ineffective channel by the controller in the mobile communication terminal; and
    turning on/off an amplifier amplifying an audio signal of the changed channel by the controller, according to the discriminating result, wherein the step of discriminating whether the changed channel is an effective or ineffective channel comprising:
    reading a status register of a demodulator loaded in the mobile communication terminal and thus judging whether a carrier is contained in a broadcasting signal corresponding to the changed channel, by the controller; and
    recognizing the changed channel as the ineffective channel by the controller if the carrier does not exist.

11. A method of controlling an audio output in a mobile communication terminal having a television function comprising:
    sensing a change of a broadcasting channel by a controller loaded in the mobile communication terminal;
    discriminating whether the changed channel is an effective or ineffective channel by the controller in the mobile communication terminal; and
    turning on/off an amplifier amplifying an audio signal of the changed channel by the controller, according to the discriminating result, wherein the step of discriminating whether the changed channel is an effective or ineffective channel comprising:
    reading a status register of a decoder loaded in the mobile communication terminal and thus judging whether a video-synchronizing signal is contained in a video signal separated from a broadcasting signal corresponding to the changed channel, by the controller; and
    recognizing the changed channel as the ineffective channel by the controller if the video-synchronizing signal does not exist.

12. A method of controlling an audio output in a mobile communication terminal having a television function comprising:
    sensing a change of a broadcasting channel by a controller loaded in the mobile communication terminal;
    discriminating whether the changed channel is an effective or ineffective channel by the controller in the mobile communication terminal; and
    turning on/off an amplifier amplifying an audio signal of the changed channel by the controller, according to the discriminating result, wherein the step of discriminating whether the changed channel is an effective or ineffective channel may comprising:
    reading a status register of a demodulator loaded in the mobile communication terminal and thus judging whether a carrier is contained in a broadcasting signal corresponding to the changed channel, by the controller;

reading a status register of a decoder loaded in the mobile communication terminal and thus judging whether a video-synchronizing signal is contained in a video signal separated from a broadcasting signal corresponding to the changed channel, by the controller; and recognizing the changed channel as the ineffective channel by the controller if at least one of the carrier and the video-synchronizing signal does not exist.

* * * * *